United States Patent
Kumamoto et al.

(10) Patent No.: US 11,511,683 B2
(45) Date of Patent: Nov. 29, 2022

(54) VEHICLE HEADLINER AND PRODUCTION METHOD THEREOF

(71) Applicants: TOYOTA BOSHOKU KABUSHIKI KAISHA, Aichi (JP); K-PLASHEET CORPORATION, Chiba (JP)

(72) Inventors: Takayuki Kumamoto, Aichi (JP); Tsutomu Takagi, Gifu (JP); Atsuhiro Hattori, Aichi (JP)

(73) Assignees: TOYOTA BOSHOKU KABUSHIKI KAISHA, Aichi (JP); K-PLASHEET CORPORATION, Chiba (JP)

( * ) Notice: Subject to any disclaimer, the term of this patent is extended or adjusted under 35 U.S.C. 154(b) by 174 days.

(21) Appl. No.: 16/156,187

(22) Filed: Oct. 10, 2018

(65) Prior Publication Data

US 2019/0111859 A1 Apr. 18, 2019

(30) Foreign Application Priority Data

Oct. 18, 2017 (JP) .............................. JP2017-202191

(51) Int. Cl.
*B60R 13/02* (2006.01)
*B32B 5/02* (2006.01)
(Continued)

(52) U.S. Cl.
CPC .......... *B60R 13/0225* (2013.01); *B32B 5/022* (2013.01); *B32B 5/026* (2013.01); *B32B 5/18* (2013.01); *B32B 7/12* (2013.01); *B32B 15/088* (2013.01); *B32B 15/14* (2013.01); *B32B 15/20* (2013.01); *B32B 2262/101* (2013.01); *B32B 2266/0278* (2013.01);
(Continued)

(58) Field of Classification Search
CPC .......................... B32B 5/26; D06N 2211/261; B60Q 2500/10; Y10T 442/60
See application file for complete search history.

(56) References Cited

U.S. PATENT DOCUMENTS 3,707,433 A * 12/1972 Clough et al. ............ E04C 2/26
428/137
4,851,283 A * 7/1989 Holtrop ..................... B32B 5/24
442/370
(Continued)

FOREIGN PATENT DOCUMENTS

CN 1638960 A 7/2005
JP S60-259682 A 12/1985
(Continued)

OTHER PUBLICATIONS

Polymer Melting Points, polyamide, Polymerdatabasecom, online reference (Year: 2021).*
(Continued)

*Primary Examiner* — Jennifer A Steele
(74) *Attorney, Agent, or Firm* — Greenblum & Bernstein, P.L.C.

(57) ABSTRACT

The vehicle headliner includes a base layer, a skin layer disposed on one side of the base layer, and an infrared reflecting layer and a protection layer, in this order, disposed on the other side of the base layer. The base layer contains thermoplastic resin and fiber. The protection layer is a non-stretched resin layer containing a thermoplastic resin having a melting point of 200° C. or more.

10 Claims, 3 Drawing Sheets

(51) Int. Cl.
  *B32B 15/14* (2006.01)
  *B32B 15/088* (2006.01)
  *B32B 7/12* (2006.01)
  *B60R 13/08* (2006.01)
  *B32B 5/18* (2006.01)
  *B32B 15/20* (2006.01)

(52) U.S. Cl.
  CPC ..... *B32B 2605/003* (2013.01); *B60R 13/0815* (2013.01); *B60R 2013/0287* (2013.01)

(56) References Cited

U.S. PATENT DOCUMENTS

| | | | |
|---|---|---|---|
| 6,955,845 B1* | 10/2005 | Poole | B32B 3/02 296/39.3 |
| 10,249,281 B2 | 4/2019 | Watanabe et al. | |
| 2003/0124271 A1* | 7/2003 | Michael | B60R 13/0225 428/31 |
| 2004/0222671 A1* | 11/2004 | Nagayama | B60R 13/0815 296/211 |
| 2007/0042664 A1* | 2/2007 | Thompson | B27N 3/12 442/335 |
| 2011/0045724 A1* | 2/2011 | Bahukudumbi | B32B 5/145 442/57 |
| 2013/0164528 A1* | 6/2013 | Nomura | B32B 5/00 428/336 |
| 2014/0050886 A1* | 2/2014 | Burgin | B32B 5/245 428/138 |
| 2014/0178633 A1 | 6/2014 | Kleinschmidt et al. | |
| 2016/0207283 A1* | 7/2016 | Wang | B32B 5/18 |
| 2016/0329038 A1 | 11/2016 | Watanabe et al. | |
| 2020/0331230 A1* | 10/2020 | Bush | D04H 1/74 |

FOREIGN PATENT DOCUMENTS

| | | | | |
|---|---|---|---|---|
| JP | 2001518427 A | | 10/2001 | |
| JP | 2003237492 A | | 8/2003 | |
| JP | 2012-086661 A | | 5/2012 | |
| JP | 2013-129308 A | | 7/2013 | |
| KR | 10-2014-0016952 A | | 2/2014 | |
| WO | WO9960222 | * | 11/1999 | E04B 1/78 |
| WO | WO2015/097885 A | | 7/2015 | |

OTHER PUBLICATIONS

Korean Office Action issued in Korean Counterpart Patent Appl. No. 10-2018-0120926, dated Oct. 31, 2019, along with an English translation thereof.

Korean Office Action issued in KR Counterpart Patent Appl. No. 10-2018-0120926, dated May 28, 2020, along with an English translation thereof.

Office Action issued in Chinese Counterpart Patent Appl. No. CN 201811209189.X, dated Aug. 3, 2021, along with an English translation thereof.

Office Action issued in Korea Counterpart Patent Appl. No. 10-2018-0120926, dated Oct. 29, 2020, along with an English translation thereof.

Office Action issued in Japan Counterpart Patent Appl. No. JP2017-202191, dated Jun. 8, 2021, along with an English translation thereof.

* cited by examiner

VEHICLE HEADLINER AND PRODUCTION METHOD THEREOF

BACKGROUND OF THE INVENTION

(1) Field of the Invention

The present invention relates to a vehicle headliner arranged on the inner side of a car roof and a production method thereof.

(2) Description of Related Art

Cars are commonly provided with a vehicle headliner on the inner side of a steel plate that is part of the roof for achieving heat insulation, shock absorption, and other effects. Usually, car roofs have a deep drawn shape as a whole, which is also complex because of recesses and protrusions for installing visors, assist grips and so on, and openings for fitting in a center console, a roof window and so on.

It is essential to use an air conditioner when starting up a car that has been left in the scorching sun, for example, because of the soaring temperature inside. This entails increased use of fuel, which also leads to an increase in the amount of exhaust gas ($CO_2$). An enormous amount of energy is thus consumed to keep the temperature inside the car from rising.

JP 2013-129308 A discloses a vehicle headliner, including a base member made of a foam material such as semi-rigid urethane foam, a first fiber layer for reinforcement provided on the front side of the base member, a first adhesive applied on the surface of the first fiber layer, a skin layer bonded to the first fiber layer by the first adhesive to form the ceiling surface of the car interior, a second fiber layer for reinforcement provided on the backside of the base member, a second adhesive applied on the surface of the second fiber layer, an infrared reflecting layer bonded to the second fiber layer by the second adhesive. A transparent protection layer made of resin is formed on the surface of the infrared reflecting layer, and the protection layer has a thickness set in the range of from 5 to 25 μm. A preferable production method of this vehicle headliner is described as including a material preparation step wherein the base member, front-side fiber layer, backside fiber layer, and skin layer are laminated, and an integrated assembly of the infrared reflecting layer with the protection layer laminated on the surface opposite from the backside fiber layer is set, to obtain a material for a forming process; and the forming process wherein hot pressing is performed using this material.

SUMMARY OF THE INVENTION

The present inventors investigated a production method of a vehicle headliner that uses a skin material, a base member, an infrared reflecting material, and a protection layer forming material. Instead of the base member made of a foam used in JP 2013-129308 A, a composite material containing thermoplastic resin and fiber was used as the base member, and a protection layer forming material made of thermoplastic resin was used. The skin material, base member, infrared reflecting material, and protection layer forming material were integrated in this order, and this laminated material was subjected to a forming process. More specifically, this laminated material was softened by applying heat, to be subjected to cold pressing. With a stretched thermoplastic resin film, the film was prone to tear during the forming process, as a result of which the structural stability of the obtained vehicle headliner was sometimes not satisfactory.

An object of the present invention is to provide a vehicle headliner with excellent structural stability, and a production method thereof.

The present inventors solved the problem described above by using a base member made of a composite material containing thermoplastic resin and fiber instead of a base member made of a foam, and by using a non-stretched material containing a thermoplastic resin having a melting point of 200° C. or more for the protection layer.

The present invention provides a vehicle headliner including: a base layer, a skin layer disposed on one side of the base layer, and an infrared reflection layer and a protection layer, in this order, disposed on the other side of the base layer, the base layer containing thermoplastic resin and fiber, and the protection layer being a non-stretched resin layer containing a thermoplastic resin having a melting point of 200° C. or more.

In the present invention, the thermoplastic resin contained in the base layer should preferably be polyolefin.

In the present invention, the thermoplastic resin contained in the protection layer should preferably be polyester or polyamide.

According to another aspect of the present invention, a production method of the vehicle headliner is provided, which is a method of producing a vehicle headliner using a skin sheet material, a base fiber assembly containing a thermoplastic resin having a melting point of not greater than 180° C. and fiber, and a laminated film including a non-stretched resin layer containing a thermoplastic resin having a melting point of 200° C. or more and an infrared reflecting layer. The method includes a first laminated material fabrication step of fabricating a first laminated material, using the base fiber assembly and the laminated film, wherein the base fiber assembly and the infrared reflecting layer of the laminated film are bonded so that the first laminated material has a base layer originating from the base fiber assembly, and an infrared reflecting layer and a resin layer originating from the laminated film, in this order; and a forming step of cold pressing, at a temperature of not more than 35° C., a bonded assembly of the skin sheet material and the first laminated material that are in a heated condition, wherein the skin sheet material and the first laminated material are overlapped such that the skin sheet material is in contact with the base layer of the first laminated material, and heated at 180° C. to 200° C. to melt the thermoplastic resin contained in the base layer.

In another aspect of the present invention, the thermoplastic resin contained in the base fiber assembly and having a melting point of not more than 180° C. should preferably be polyolefin.

In another aspect of the present invention, the thermoplastic resin contained in the resin layer and having a melting point of 200° C. or more should preferably be polyester or polyamide.

In another aspect of the present invention, the infrared reflecting layer should preferably contain metal.

The vehicle headliner of the present invention includes a skin layer, a base layer, an infrared reflecting layer, and a protection layer in this order, and because of the particular materials forming the base layer and protection layer, it has excellent structural stability. With the vehicle headliner production method according to another aspect of the present invention, the vehicle headliner with excellent structural stability can be produced efficiently.

DETAILED DESCRIPTION OF PREFERRED EMBODIMENT

Hereinafter, the present invention will be described in detail with reference to the drawings.

The matters shown herein are illustrative and for illustratively explaining the embodiment of the present invention, and are stated for the purpose of providing what is considered to be a most effectively and easily comprehensible description of principles and conceptual characteristics of the present invention. In this regard, it is not intended to show more structural details of the present invention than necessary for fundamental understanding of the present invention but rather it is intended, with the explanation combined with the drawings, to make it obvious to the person skilled in the art how some forms of the present invention are embodied in actuality.

Figure 1:
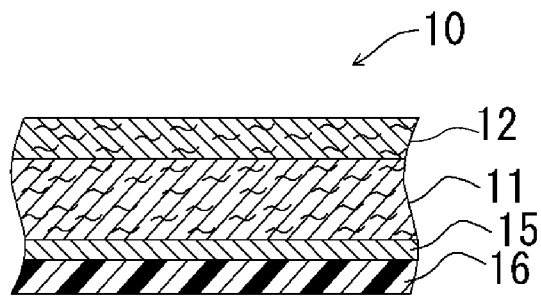
FIG. 1 is a schematic diagram illustrating one example of a partial cross section of a vehicle headliner.
Figure 2:
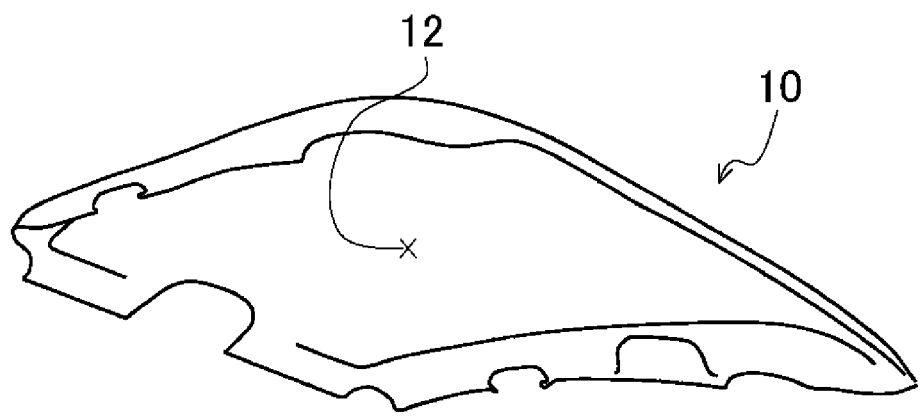
FIG. 2 is a schematic perspective view illustrating one example of the vehicle headliner.

The vehicle headliner of the present invention is an article having a sectional structure shown in FIG. 1, for example, with a flat surface part and a curved surface part, and having a shape shown in FIG. 2, for example. Namely, the vehicle headliner 10 of the present invention includes a base layer 11, a skin layer 12 disposed on one side of this base layer 11 (upper side in FIG. 1), and an infrared reflecting layer 15 and a protection layer 16, in this order, arranged on the other side (lower side in FIG. 1) of the base layer 11. The skin layer 12 indicated with x in FIG. 2 is an article disposed on the interior side of the car.

The base layer 11 is a layer containing thermoplastic resin and fiber; it may be a layer containing thermoplastic resin, fiber, and other components (to be described later) as required.

The base layer 11 may have a structure wherein the fiber is dispersed in the matrix containing thermoplastic resin, or, a structure wherein not all the fibers are covered with thermoplastic resin but partly bonded together by the thermoplastic resin. In the latter case, the base layer 11 may include sealed pores or open pores allowing for breathability from one side to the other side in between the thermoplastic resin and fiber, or may contain other components (such as resin capsules or the like as will be described later).

Examples of the thermoplastic resin may include, but not particularly limited to: polyolefins such as polypropylene, polyethylene, ethylene-propylene random copolymer; polyesters including aliphatic polyesters such as polyactic acid, polycaprolactone, polybutylene succinate and so on, and aromatic polyesters such as polyethylene terephthalate, poly trimethylene terephthalate, polybutylene terephthalate and so on; polystyrene; acrylic resin; polyamide; polycarbonate; polyacetal; ABS resin, and so on. The thermoplastic resin may be modified (acid anhydride-modified, carboxylate-modified, epoxy-modified, or oxazoline-modified) to enhance the affinity to the surface of fiber.

The thermoplastic resin should preferably be a thermoplastic resin having a melting point of not more than 180° C. From a viewpoint of structural stability of the vehicle headliner, it should preferably be polyolefin, and more preferably polypropylene.

Examples of the fiber may include, but not particularly limited to, polymer fiber, inorganic fiber, plant fiber, and so on. Examples of polymer fiber include polyester fiber, high density polyethylene fiber, polypropylene fiber, polystyrene fiber, aramid fiber, PBO fiber, and so on. Examples of inorganic fiber include glass fiber, carbon fiber, ceramic fiber, calcium silicate fiber, potassium titanate fiber, boron fiber, and so on. Plant fiber may be any staple fiber originating from any of kenaf, jute, manilla, sisal, ganpi (*Diplomorpha sikokiana*), mitsumata (*Edgeworthia chrysantha*), kozo (*Broussonetia kazinoki×B. papyrifera*), banana, pineapple, coconut, corn, sugar cane, bagasse, palm, *papyrus*, reed, esparto, sabaigrass (*Eulaliopsis binata*), wheat, rice, bamboo, softwood (ceder, cypress, etc.), hardwood, cotton, and so on.

The fiber should preferably be a fiber having a melting point of 180° C. or more, and more preferably 200° C. or more. From a viewpoint of structural stability of the vehicle headliner, it should preferably be an inorganic fiber, and more preferably glass fiber.

The base layer 11 may be a single-layer type or a multilayer type. A multilayer type may have a configuration wherein some of the layers are solely made of thermoplastic resin, or may have a configuration wherein the fiber content (distribution) varies from one side toward the other side. The base layer 11 may, but not necessarily, have some breathability from one side to the other side.

Examples of other components the base layer 11 may contain include resin capsules and the like. Preferably, the resin capsules are plastic granules having thermoplastic resin shells encapsulating a material inside that expands and increases its volume when heated (gas, or a solid or liquid that gasifies when heated), which have been heated to a temperature high enough to start expansion of the volume (hereinafter referred to as "thermally expandable microspheres").

The shells of the resin capsules should preferably contain a thermoplastic resin including a structural unit originating from at least one of the group consisting of acrylonitrile, methacrylonitrile, acrylic acid alkylester, methacrylic acid alkylester, vinyl chloride, vinylidene chloride, vinyl acetate, aromatic vinyl compound, acrylic acid, methacrylic acid, maleic acid, fumaric acid, itaconic acid, citraconic acid, acrylamide, substituted acrylamide, methacrylamide, substituted methacrylamide, and polyfunctional compounds having two or more polymerizable carbon-carbon unsaturated bonds.

The material encapsulated in the shells may be any liquid compounds having a boiling point (under atmospheric pressure) that is not higher than the softening temperature of the resin material of the shells including, but not particularly limited to, hydrocarbons such as n-butane, isobutane, cyclobutane, n-pentane, isopentane, cyclopentane, n-hexane, 2-methylpentane, 2,2-dimethylbutane, cyclohexane, n-heptane, cycloheptane, n-octane, cyclooctane, and so on; and hydrofluoroether compounds or the like such as $C_3F_7OCH_3$, $C_4F_9OCH_3$, $C_4F_9OC_2H_5$, and so on.

The base layer 11 should preferably have a thickness of 1 to 15 mm, and more preferably 3 to 10 mm, from the viewpoint of structural stability of the vehicle headliner. The thickness of the base layer of the vehicle headliner 10 according to the present invention may be uniform over the entire surface, or may be different.

The skin layer 12 preferably originates from a woven, non-woven, or knitted fabric, and may have a certain design. Examples of fibers that can be contained in the skin layer 12 include, but not particularly limited to, fibers containing polyester such as polyethylene terephthalate, poly trimethylene terephthalate, polybutylene terephthalate, Poly(ethylene 2,6-naphthalenedicarboxylate) and so on; fibers containing polyamide such as nylon 6, nylon 66 and so on; fibers containing acrylic resin; and fibers containing polyolefin such as polyethylene, polypropylene and so on.

The skin layer 12 may be directly bonded to the base layer 11, or may be bonded via an adhesive layer (not shown). Materials composing the adhesive layer are not particularly limited.

The infrared reflecting layer 15 is a layer that inhibits transfer of the heat caused by the infrared that passed through the protection layer 16 from the car roof to the base layer 11 and skin layer 12 on the car interior side of the infrared reflecting layer 15 and preferably contains an inorganic material. Examples of the inorganic material include metal or alloy such as aluminum, silver, copper, zinc, iron, stainless steel and so on; and metal oxide such as alumina, zirconia and so on. Of these, metal or alloy is preferable for its excellent infrared reflecting properties, and aluminum is particularly preferable.

The infrared reflecting layer 15 should preferably have a thickness of 0.005 to 0.2 μm, and more preferably 0.01 to 0.1 μm.

The infrared reflecting layer 15 may be directly bonded to the base layer 11, or may be bonded via an adhesive layer (not shown). The materials composing the adhesive layer are not particularly limited.

The protection layer 16 is a layer that protects the infrared reflecting layer 15 and the base layer 11, and made of a non-stretched resin layer containing a thermoplastic resin having a melting point of 200° C. or more (herein referred to as "high-melting-point resin").

Examples of the high-melting-point resin include polyester, polyamide, polyamide-imide, fluoroplastic, polyether ketone, polyether ether ketone, polyphenylene sulfide, polyetherimide, and so on. Of these, polyester and polyamide are preferable. The protection layer 16 may be a single-layer type, or a multilayer type. The protection layer 16 may, but not necessarily, have some breathability from one side to the other side.

The protection layer 16 should preferably have a thickness of 10 to 30 μm, more preferably 15 to 20 μm, from the viewpoints of appearance and structural stability.

The protection layer 16 may be directly bonded to the infrared reflecting layer 15, or may be bonded via an adhesive layer (not shown). Materials composing the adhesive layer are not particularly limited.

The vehicle headliner 10 of the present invention may include other layers as required. For example, an air shield layer may be provided between the base layer 11 and the infrared reflecting layer 15 for blocking or reducing the airflow in the thickness direction of the vehicle headliner 10. With an air shield layer provided to the vehicle headliner 10, accumulation of dust or the like on the surface of the skin layer 12 on the car interior side will be reduced, so that the assembly can maintain its design in a favorable condition over a long period.

Materials for forming the air shield layer include, but not particularly limited to, thermoplastic resins including polyolefin such as polypropylene; polyamide; polyester, and so on.

The vehicle headliner 10 of the present invention includes the skin layer 12, base layer 11, infrared reflecting layer 15, and protection layer 16 in this order, and has a deep-drawn shape, for example, as shown in FIG. 2, so that it has excellent structural stability. Therefore, the vehicle headliner 10 of the present invention can be installed to a car roof such that the skin layer 12 is disposed on the interior side of the car in an efficient manner.

The vehicle headliner of the present invention can be obtained by integrating materials corresponding to respective layers, e.g., a skin sheet material, a base fiber assembly containing thermoplastic resin and fiber, an infrared reflecting film, and a non-stretched resin film containing a thermoplastic resin having a melting point of 200° C. or more, in this order.

A vehicle headliner production method according to another aspect of the present invention is a method of producing a vehicle headliner 10 using a skin sheet material 22, a base fiber assembly 21 containing a thermoplastic resin (R1) having a melting point of not greater than 180° C. and fiber, and a laminated film 23 including a non-stretched resin layer 26 containing a thermoplastic resin (R2) having a melting point of 200° C. or more and an infrared reflecting layer 25. The method includes a first laminated material fabrication step of fabricating a first laminated material 30, using the base fiber assembly 21 and the laminated film 23, wherein the base fiber assembly 21 and the infrared reflecting layer 25 of the laminated film 23 are bonded so that the first laminated material 30 has a base layer 31 originating from the base fiber assembly 21, and an infrared reflecting layer 35 and a resin layer 36 originating from the laminated film 23, in this order; and a forming step of cold pressing, at a temperature of not more than 35° C., a bonded assembly 40 of the skin sheet material 22 and the first laminated material 30 that are in a heated condition, wherein the skin sheet material 22 and the first laminated material 30 are overlapped such that the skin sheet material 22 is in contact with the base layer 31 of the first laminated material 30, and heated at 180° C. to 200° C. to melt the thermoplastic resin (R1) contained in the base layer 31. The method may further include a finishing step or the like after the forming step, wherein the material is trimmed at the periphery, as required.

Figure 3:
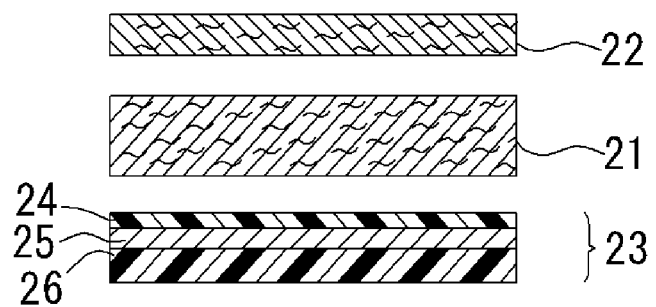
FIG. 3 is a schematic cross-sectional view of materials used in a production method of the vehicle headliner.

First, the first laminated material fabrication step is a step of fabricating a first laminated material 30 (see FIG. 4), using the base fiber assembly 21 containing a thermoplastic resin having a melting point of not greater than 180° C. and fiber, and the laminated film 23 including the non-stretched resin layer 26 containing a thermoplastic resin having a melting point of 200° C. or more and the infrared reflecting layer 25, of the materials shown in FIG. 3. The base fiber assembly 21 and the infrared reflecting layer 25 of the laminated film 23 are bonded so that the first laminated material 30 has the base layer 31 originating from the base fiber assembly 21, and a lamination 33 of the infrared reflecting layer 35 and resin layer 36 originating from the laminated film 23, in this order.

FIG. 3 shows a laminated film 23 made of preferable materials and includes an adhesive layer 24 on the surface of the infrared reflecting layer 25 in order to achieve sufficient bondability to the base fiber assembly 21.

The base fiber assembly 21 is a compound member containing a thermoplastic resin having a melting point of not greater than 180° C. and fiber, and may further include other components, as required.

Examples of thermoplastic resins having a melting point of not greater than 180° C. include polyolefins such as polypropylene, polyethylene, ethylene-propylene random copolymer and so on. The thermoplastic resin may be modified (acid anhydride-modified, carboxylate-modified, epoxy-modified, or oxazoline-modified) to enhance the affinity to the surface of fiber.

The thermoplastic resin may be in any form such as powder, fibrous, or massive form.

The fiber is preferably a fiber that does not melt, or undergo modification or deformation when heated to 180° C., and any of polymer fiber, inorganic fiber, plant fiber and the like may be used. In the present invention, inorganic fiber is more preferable. Examples of inorganic fiber include glass fiber, carbon fiber, ceramic fiber, calcium silicate fiber, potassium titanate fiber, boron fiber, and the like. Of these, glass fiber is particularly preferable.

The base fiber assembly 21 may contain other components, such as thermally expandable microspheres, chemical foaming agents, and so on. A chemical foaming agent may be contained in the thermoplastic resin in powder, fibrous, or massive form.

While the thermoplastic resin and fiber contained in the base fiber assembly 21 should preferably be distributed uniformly, the base fiber assembly may have a fiber content (distribution) varying from one side to the other side.

The base fiber assembly 21 may, but not necessarily, have a thickness of 5 to 30 mm, and more preferably 5 to 15 mm, from the viewpoints of securing bondability to the laminated film 23 and appearance and structural stability of the resultant headliner.

The laminated film 23 is a multilayer film including a non-stretched resin layer 26 containing a thermoplastic resin having a melting point of 200° C. or more (high-melting-point resin), and infrared reflecting layer 25. As mentioned above, the laminated film 23 in FIG. 3 includes an adhesive layer 24. With the non-stretched resin layer 26, the resultant vehicle headliner can have excellent structural stability.

The resin contained in the protection layer 16 of the vehicle headliner 10 of the present invention can also be used as the high-melting-point resin contained in the resin layer 26 that is part of the laminated film 23, polyester and polyamide being the preferable ones.

The resin layer 26 should preferably have a thickness of 10 to 30 μm, more preferably 15 to 20 μm, from the viewpoints of appearance and structural stability of the resultant headliner. Thus the resin layer 26 should preferably be a layer made of a polyester or polyamide non-stretched film.

The infrared reflecting layer 25 that is part of the laminated film 23 is a layer that preferably contains metal or alloy such as aluminum, silver, copper, zinc, iron, stainless steel and so on; and metal oxide such as alumina, zirconia and so on. More preferably, it is a layer containing metal or alloy, and particularly preferably, a layer containing aluminum.

The infrared reflecting layer 25 should preferably have a thickness of 0.005 to 0.2 μm, and more preferably 0.01 to 0.1 μm.

The infrared reflecting layer 25 may be directly bonded to the resin layer 26, or may be bonded via an adhesive layer not shown in FIG. 3.

The adhesive layer 24 is provided for reliably bonding together the base fiber assembly 21 and the laminated film 23 to obtain a first laminated material.

The material forming the adhesive layer 24 is not limited to a particular type. A commonly known adhesive may be used. In the present invention, the adhesive layer should preferably contain the same type of thermoplastic resin as that contained in the base fiber assembly 21, or thermoplastic resin that has affinity thereto. Thus, when the thermoplastic resin contained in the base fiber assembly 21 is polyolefin, it is preferable that the adhesive layer 24 primarily contains polyolefin.

The adhesive layer 24 may, but not necessarily, have a thickness of 10 to 30 μm, and more preferably 15 to 20 μm.

Figure 4:
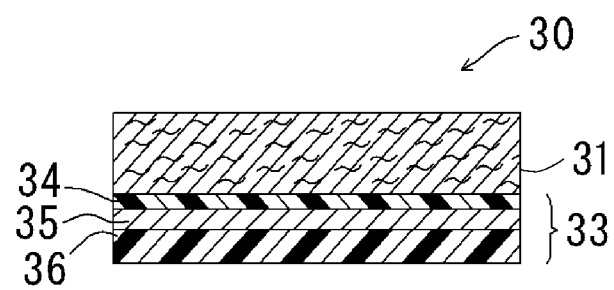
FIG. 4 is a schematic cross-sectional view illustrating a first laminated material obtained in a first laminated material fabrication step in the production method of the vehicle headliner.

When using the laminated film 23 of FIG. 3, in the first laminated material fabrication step, the base fiber assembly 21 and the infrared reflecting layer 25 of the laminated film 23 are bonded via the adhesive layer 24, so as to obtain the first laminated material 30 that has the base layer 31 originating from the base fiber assembly 21, and the infrared reflecting layer 35 and resin layer 36 originating from the laminated film 23, in this order (see FIG. 4). The method by which the base fiber assembly 21 and the laminated film 23 are bonded may be selected suitably in accordance with the components of the adhesive layer 24 and not limited to a particular method. A preferable method is pressure application, and more preferably, heat and pressure application.

While FIG. 4 clearly shows an adhesive layer 34 originating from the adhesive layer 24 of FIG. 3, if the adhesive layer 24 is composed of the same type of thermoplastic resin as that contained in the base fiber assembly 21, the base layer 31 and infrared reflecting layer 35 may bond to each other well enough to make the adhesive layer 34 obscure.

Figure 5:
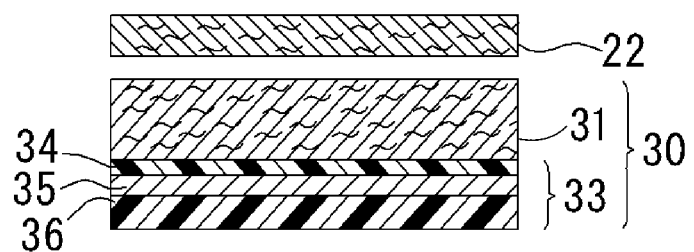
FIG. 5 is a schematic cross-sectional view illustrating one form of arrangement of the first laminated material and a skin sheet material before being supplied to a forming step in the production method of the vehicle headliner.
Figure 6:
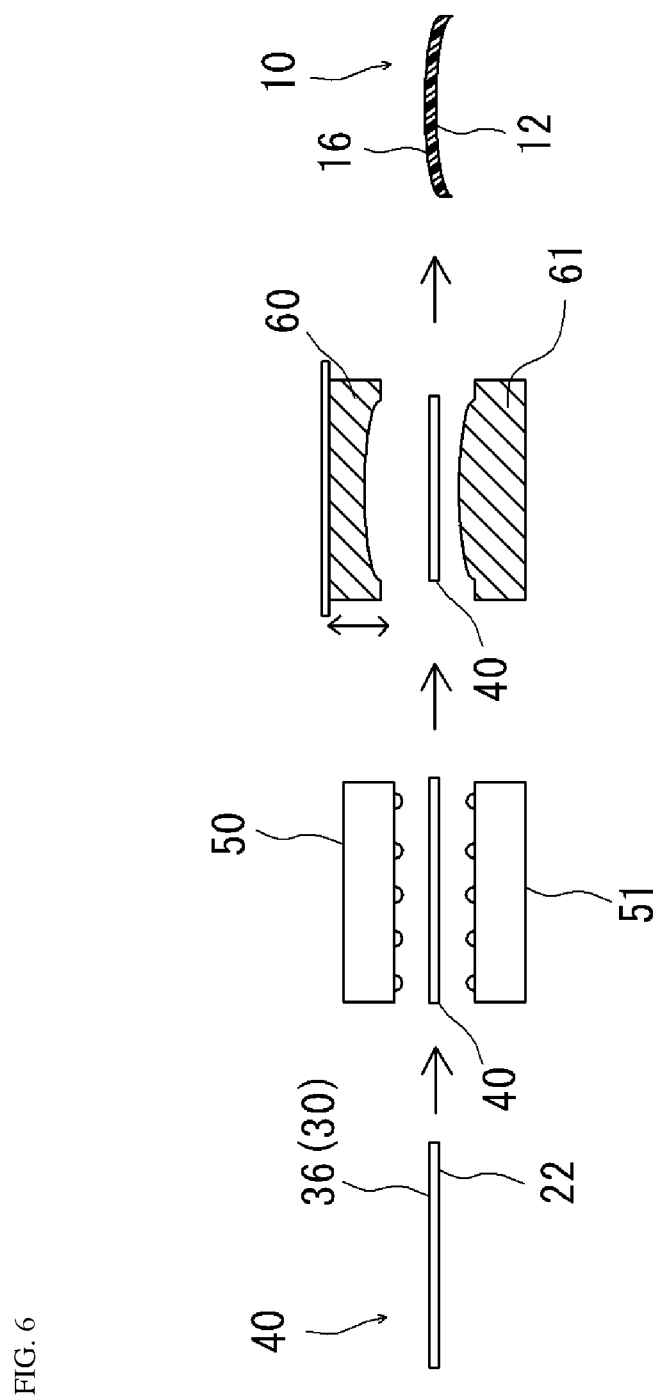
FIG. 6 is a schematic view illustrating the forming step in the production method of the vehicle headliner.

Next, in the forming step, the first laminated material 30 and a skin sheet material 22 are used. As shown in FIG. 5, with the skin sheet material 22 overlapped on the first laminated material 30 such that the skin sheet material 22 contacts the base layer 31 of the first laminated material 30 (hereinafter referred to as "second laminated material 40"), this second laminated material 40 is heated at 180° C. to 200° C. (using heaters 50 and 51, for example) to melt the thermoplastic resin contained in the base layer 31 and having a melting point of not more than 180° C., and the bonded assembly of the heated skin sheet material 22 and first laminated material 30 (second laminated material 40) are cold-pressed at a temperature of not more than 35° C. (see FIG. 6).

When overlapping the skin sheet material 22 on the first laminated material 30, there may be provided an adhesive sheet containing a resin that melts at a temperature between 120° C. and 180° C. between the skin sheet material 22 and the base layer 31 of the first laminated material 30.

For the cold pressing in the forming step, molds having a cavity at least in the shape of the vehicle headliner (cold press molds 60 and 61, for example) are used to form the bonded assembly of the first laminated material 30 and skin sheet material 22 in the softened state, which is larger than the cavity, into the shape of the cavity, by the process noted above.

The time for the cold pressing is usually, but not limited to, 15 to 60 seconds.

After the forming step, a finishing step may be performed, wherein ends may be trimmed or otherwise treated by laser processing, press trimming, water jet trimming, ultrasonic cutting and so on, followed by another process of enhancing the appearance such as bending end faces or the like, as required.

Retainers, wire harnesses, shock absorbers, reinforcements, acoustic absorbers, heat insulation material, and so on can then be disposed on the protection layer side of the thus obtained vehicle headliner.

EXAMPLE

The embodiment of the present invention will be described more specifically below with reference to an example. It should be understood that the present invention shall not be limited by this example in any way.

Example 1

Materials shown in FIG. 3 were used in the production.

The base fiber assembly denoted by reference numeral 21 is a fiber assembly mat containing glass fiber and polypropylene powder.

The skin sheet material denoted by reference numeral 22 is composed of three layers of non-woven fabric, urethane foam, and knitted fabric.

The laminated film denoted by reference numeral 23 is a multilayer film composed of a 12 μm thick non-stretched film (protection layer 26, or "resin layer") containing nylon having a melting point of 210° C., a 0.02 μm thick aluminum deposited layer (infrared reflecting layer 25), and a 20 μm thick adhesive layer 24 containing polypropylene, formed one upon another in this order.

First, the base fiber assembly 21 and the laminated film 23 were overlapped such that the adhesive layer 24 of the laminated film 23 faced the base fiber assembly 21, and heated under pressure. Thus the integrated assembly shown in FIG. 4, i.e., the first laminated material 30 having the base layer 31, adhesive layer 34, infrared reflecting layer 35, and protection layer 36 (i.e., resin layer) in this order was obtained. The base layer 31 is a compressed layer wherein the polypropylene powder contained in the fiber assembly was melted by the heat applied during the pressing so that the glass fibers are bonded to each other by the polypropylene.

After that, the skin sheet material 22 and the first laminated material 30 were overlapped such that the base layer 31 of the first laminated material 30 faced the skin sheet material 22, and heated for 1 minute at 200° C. with far-infrared ray and hot air, and in this state, they were set in molds having a cavity with a shape that at least conforms to the vehicle headliner, and subjected to cold pressing at 35° C.

The resultant vehicle headliner intermediate product was trimmed at the periphery to obtain the vehicle headliner. Surface temperatures of this vehicle headliner in the sunlight were compared and the results of evaluation were favorable.

Comparative Example 1

A vehicle headliner was obtained similarly to Example 1, except that the laminated film denoted by reference numeral 23 was a multilayer film including a protection layer 26 (i.e., resin layer) made of a 12 μm thick stretched film containing polyethylene terephthalate having a melting point of 260° C. An appearance evaluation of this vehicle headliner revealed that there were tears in part of the protection layer.

The foregoing description is merely for the purpose of illustration and should not be interpreted as limiting the present invention. While the present invention has been described with reference to a representative embodiment thereof, it should be understood that the words used in the description and illustration of the present invention are words of description and illustration rather than limitation. As has been described herein in detail, changes can be made in the embodiments without departing from the scope or spirit of the present invention and within the scope of the invention as defined in the attached claims. While the present invention has been described in detail herein with reference to particular structures, materials, and embodiments thereof, it is not intended to limit the present invention to the matters disclosed herein, but rather, it is intended to cover, in the appended claims, all the functionally equivalent structures, methods, and uses of the present invention.

What is claimed is:

1. A vehicle headliner comprising: a single base layer, a fabric skin layer disposed on one side of and in direct contact with the base layer such that fabric of the fabric skin layer is in direct contact with the base layer; and an infrared reflecting layer and a protection layer, in this order, disposed on the other side of the base layer,
   wherein the vehicle headliner has a deep-drawn shape,
   wherein the base layer comprises a thermoplastic resin and fiber,
   wherein the thermoplastic resin contained in the base layer is polyolefin,
   wherein the fiber contained in the base layer is a glass fiber,
   wherein the infrared reflecting layer is a metal layer,
   wherein the protection layer is a non-stretched resin layer containing a thermoplastic resin having a melting point of 200° C. or more, and
   wherein the thermoplastic resin contained in the protection layer is polyamide.

2. The vehicle headliner according to claim 1, wherein a thickness of the protection layer is in a range from 10 μm to 30 μm, and a thickness of the infrared reflecting layer is in a range from 0.005 μm to 0.2 μm.

3. The vehicle headliner according to claim 1, wherein the metal layer is an aluminum layer.

4. The vehicle headliner according to claim 1, wherein a thickness of the base layer is in a range from 1 mm to 15 mm.

5. The vehicle headliner according to claim 1, wherein the fabric skin layer is consisting of three layers of non-woven fabric, urethane foam, and knitted fabric, from the base layer side.

6. The vehicle headliner according to claim 1, wherein the polyolefin is a polypropylene.

7. A method of producing the vehicle headliner according to claim 1 using a skin sheet material, a base fiber assembly containing a thermoplastic resin having a melting point of not greater than 180° C. and fiber, and a laminated film including a non-stretched resin layer containing a thermoplastic resin having a melting point of 200° C. or more and an infrared reflecting layer, the method comprising:
   fabricating a first laminated material, using the base fiber assembly and the laminated film, wherein the base fiber assembly and the infrared reflecting layer of the laminated film are bonded so that the first laminated material has a base layer originating from the base fiber assembly, and an infrared reflecting layer and a resin layer originating from the laminated film, in this order; and
   cold pressing, at a temperature of not more than 35° C., a bonded assembly of the skin sheet material and the first laminated material that are in a heated condition, wherein the skin sheet material and the first laminated material are overlapped such that the skin sheet material is in contact with the base layer of the first laminated material, and heated at 180° C. to 200° C. to melt the thermoplastic resin contained in the base layer.

8. The vehicle headliner production method according to claim 7, wherein the thermoplastic resin contained in the base fiber assembly and having a melting point of not more than 180° C. is polyolefin.

9. The vehicle headliner production method according to claim 7, wherein the thermoplastic resin contained in the resin layer and having a melting point of 200° C. or more is polyester or polyamide.

10. The vehicle headliner production method according to claim 7, wherein the infrared reflecting layer contains metal.

* * * * *